(12) United States Patent
Miklosch et al.

(10) Patent No.: US 10,509,812 B2
(45) Date of Patent: Dec. 17, 2019

(54) REDUCING TRANSLATION VOLUME AND ENSURING CONSISTENT TEXT STRINGS IN SOFTWARE DEVELOPMENT

(71) Applicant: SAP SE, Walldorf (DE)

(72) Inventors: Yvonne Miklosch, Nussloch (DE); Michail Vasiltschenko, Schriesheim (DE); Ralph Debusmann, Ludwigsburg (DE); Iuliia Konstantinova, Mannheim (DE)

(73) Assignee: SAP SE, Walldorf (DE)

( * ) Notice: Subject to any disclaimer, the term of this patent is extended or adjusted under 35 U.S.C. 154(b) by 88 days.

(21) Appl. No.: 15/290,228

(22) Filed: Oct. 11, 2016

(65) Prior Publication Data
US 2018/0101366 A1  Apr. 12, 2018

(51) Int. Cl.
*G06F 16/33* (2019.01)
(52) U.S. Cl.
CPC ................... *G06F 16/334* (2019.01)
(58) Field of Classification Search
CPC .................................................. G06F 8/10–78
See application file for complete search history.

(56) References Cited

U.S. PATENT DOCUMENTS

| | | | | |
|---|---|---|---|---|
| 7,124,073 B2 * | 10/2006 | Tokuda | ............... | G06F 17/2765 704/2 |
| 8,352,919 B2 | 1/2013 | Misch et al. | | |
| 8,694,483 B2 * | 4/2014 | Roulland | ............ | G06F 16/3325 707/706 |
| 8,782,556 B2 * | 7/2014 | Badger | ................. | G06F 3/0237 715/816 |
| 9,002,701 B2 * | 4/2015 | Kandekar | ........... | G06F 17/2745 704/1 |
| 9,430,253 B2 | 8/2016 | Debusmann | | |
| 2003/0154068 A1 * | 8/2003 | Tokuda | ............... | G06F 17/2765 704/7 |
| 2011/0078658 A1 * | 3/2011 | Misch | ....................... | G06F 8/71 717/121 |
| 2011/0144972 A1 * | 6/2011 | Koenig | ................. | G06F 9/4448 704/2 |
| 2011/0202876 A1 * | 8/2011 | Badger | ................. | G06F 3/0237 715/816 |
| 2013/0080875 A1 * | 3/2013 | Debusmann | ........ | G06F 17/2247 715/234 |

* cited by examiner

*Primary Examiner* — Bing Zhao
(74) *Attorney, Agent, or Firm* — Fish & Richardson P.C.

(57) ABSTRACT

Methods, systems, and computer-readable storage media for providing a list of similar texts to a user developing a software program include actions of receiving an original source text (OST) from the user, the OST including a text string, providing an OST with quality correction (OST-QC), the OST-QC including one or more corrections to the OST, determining that a source text repository includes entries associated with one or more source texts that are sufficiently similar, and in response, providing a list of similar texts, the list of similar texts including one or more OST-QCs of respective entries in the source text repository, and transmitting the list of similar texts for display to the user, a similar text of the list of similar texts being automatically inserted into the software program in response to user selection of the similar text from the list of similar texts.

19 Claims, 4 Drawing Sheets

REDUCING TRANSLATION VOLUME AND ENSURING CONSISTENT TEXT STRINGS IN SOFTWARE DEVELOPMENT

BACKGROUND

Entities, such as software developers and/or vendors, provide software and services. Example software can include enterprise software. When executed, software typically includes text to provide information to users. In some examples, one or more user interfaces (UIs) can be displayed and can include text providing information to a user and/or instructing the user. For example, a message can be displayed informing the user of an error.

Software development can include developers (e.g., UI designers, programmers), who provide text that is to be displayed within UIs during execution of the software. Depending on the intended audience, the language that the text is provided in can vary. For example, the text can be provided in English, if the software is intended for an English-speaking audience (e.g., English-speaking users). It often occurs, however, that a developer is a non-native English speaker. Consequently, the developer can provide the text in their native language, and use a translation program to translate text into their non-native language. In another example, the non-native English-speaking developer can provide text in English. Either, however, can result in a relatively large number of variants of the same intended text. Further, developers can include abbreviations in the text. For example, if an amount of space within a UI is of concern, the developer may provide an abbreviation for one or more words instead of the full word. This can also result in a relatively large number of variants of the same intended text.

In view of the variants in text that can result in the software development process, the burden on computer-implemented translation systems can be relatively high. Further, the variants result in inconsistent text being displayed to users, which can negatively impact user experience.

SUMMARY

Implementations of the present disclosure include computer-implemented methods for providing a list of similar texts to a user developing a software program. In some implementations, actions include receiving an original source text (OST) from the user, the OST including a text string, providing an OST with quality correction (OST-QC), the OST-QC including one or more corrections to the OST, determining that a source text repository includes entries associated with one or more source texts that are sufficiently similar, and in response, providing a list of similar texts, the list of similar texts including one or more OST-QCs of respective entries in the source text repository, and transmitting the list of similar texts for display to the user, a similar text of the list of similar texts being automatically inserted into the software program in response to user selection of the similar text from the list of similar texts. Other implementations of this aspect include corresponding systems, apparatus, and computer programs, configured to perform the actions of the methods, encoded on computer storage devices.

These and other implementations can each optionally include one or more of the following features: determining that the source text repository includes entries associated with one or more source texts that are sufficiently similar to the OST-QC includes: providing an edit distance based on comparing the OST-QC to a OST-QC of a respective entry in the source text repository, and determining that the edit distance is below a threshold edits distance, and in response, including the OST-QC of the respective entry in the list of similar source texts; determining that the source text repository includes entries associated with one or more source texts that are sufficiently similar includes: providing an overlap score based on comparing a list of normalized words/phrases associated with the OST-QC to a list of normalized words/phrases of a respective entry in the source text repository, and determining that the overlap score exceeds a threshold overlap score, and in response, including an OST-QC of the respective entry in the list of similar source texts; the list of normalized words/phrases associated with the OST-QC is at least partially provided based on one or more part-of-speech (POS) tags assigned to one or more words of the OST-QC, and comparing two or more of the POS tags to one or more POS tag patterns; actions further include: determining that an entry in the source text repository associated with the similar text includes at least one translation of the similar text, and providing the at least one translation for display to the user; the at least one translation is provided from a computer-implemented translation service based on a OST-QC associated with the similar text; and quality corrections include one or more of a spelling correction and a grammar correction.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Like reference symbols in the various drawings indicate like elements.

Implementations of the present disclosure are generally directed to enhancing accuracy and consistency of text used in software programs, and reducing translation cost, in terms of technical resources, financial resources, and time for such texts. More particularly, implementations of the present disclosure are directed to providing a list of similar texts to a user developing a software program. In some implementations, actions include receiving an original source text (OST) from the user, the OST including a text string, providing an OST with quality correction (OST-QC), the OST-QC including one or more corrections to the OST, determining that a source text repository includes entries associated with one or more source texts that are sufficiently similar, and in response, providing a list of similar texts, the list of similar texts including one or more OST-QCs of respective entries in the source text repository, and transmitting the list of similar texts for display to the user, a similar text of the list of similar texts being automatically inserted into the software program in response to user selection of the similar text from the list of similar texts.

As described in further detail herein, implementations of the present disclosure provide a computer-implemented text service for providing text that is to be used in software. As described herein, the computer-implemented service of the present disclosure improves the consistency of text used in UIs, for example, and reduces the cost (e.g., technical cost, in terms of processors, memory, bandwidth, etc., as well as in terms of financial resources and time) for translation of text using computer-implemented translation services. Implementations of the present disclosure provide correction and normalization of text used in software to inhibit the proliferation of source text variants, resulting in more consistent UIs.

Implementations of the present disclosure will be described in further detail with reference to example text strings. The following example text variants will be referenced:

User does not exist
User do not exist
User does not exists
The user does not exist.
The user does not exist
User does not exist.
User is not existing
User is not available
User not exists
This user does not exist The above example text variants include real-world examples of actual text entered by developers in developing software programs. Although all ten of the above example text strings are intended to have the same meaning, ensuing translation steps yield inconsistent translated text, and translation costs are multiplied. In other real-world examples, the number of variants in the text strings can be even greater than the ten referenced herein.

In accordance with implementations of the present disclosure, the number of source text variants can be significantly reduced. For example, implementations of the present disclosure can reduce the number of the above example text variants from ten to a single, normalized text string (e.g., The user does not exist). As a result, costs for text translation can be significantly reduced, and the consistency of the texts can be significantly improved.

Figure 1:
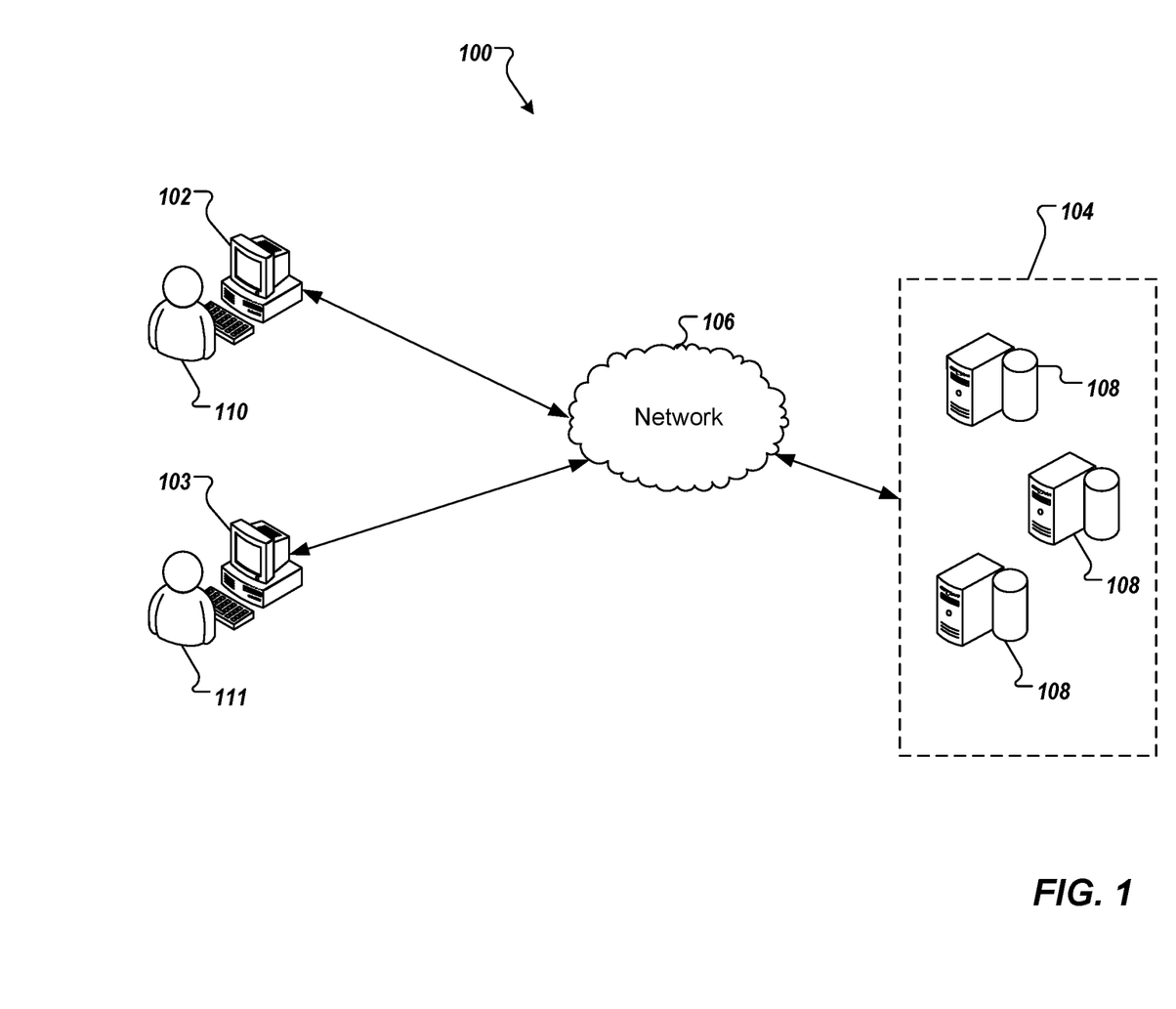
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, 103 a server system 104 and a network 106. The server system 104 includes one or more server devices 108. In the depicted example, respective users 110, 111 interact with the client devices 102, 103. In an example context, a user 110 can include a user, who interacts with an application that is hosted by the server system 104. In another example context, a user 111 can include a developer, who interacts with the server system 104 to develop software applications, described in further detail herein. For example, the server system 104 can host an integrated development environment (IDE) that the user 111 uses to develop software (e.g., to develop the application that the user 110 interacts with).

In some examples, the client devices 102, 103 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

As introduced above, implementations of the present disclosure are directed to reducing the number of text variants used during software development. In software development, developers (e.g., UI designers, programmers) create text that will be displayed in an application. For example, the developer can provide text that will be displayed in a UI. Example UIs can include, without limitation, buttons, dialogue boxes, menu entries, messages, and the like. In some examples, the text is translated into one or more languages. For example, the text can be provided in a first language (e.g., English) for an English-language version of the application (e.g., directed to English speakers), and can be translated into a second language (e.g., German) for a German-version of the application (e.g., directed to German speakers). In some examples, computer-implemented translation services are used to conduct the translations.

In some examples, the number of variants of a particular text can significantly increase the translation costs in terms of computing resources (e.g., processors, memory, bandwidth), as well as in terms of financial costs and time. That is, the more variants there are to translate, the more resources required to execute the translations. As introduced above, variants in text can occur for one or more reasons. For example, a non-native English-speaking developer may be entering the text in English during development, which text includes mistakes, includes words in an incorrect order, leaves out words (e.g., articles), or uses words too often. In general, people with different mother tongues make different mistakes, which are often typical for speakers of their native language (e.g., applying the order of words they are used to directly, or translate literally from their native language into English).

Texts are created for different products or for different versions of one software product. For example, a software product can be available in different technologies (e.g., as a mobile application, as a desktop application, as a web-based (hosted) application). In some examples, different developers can be working on different versions of a software product. Consequently, the number of text variants can multiply across the different versions of the same software product, as different developers may enter different text for the same thing.

Furthermore, developers can introduce abbreviations in particular text in an effort to reduce the amount of space that the text occupies (e.g., within a UI, on a display). As one non-limiting example, the term "purchase order" can be abbreviated to "purch.order," and/or "PO." This also introduces variants, as a first text can include "purchase order," a second text can include "purch.order," and a third text can include "PO."

In some cases, variants result from developers use of synonyms, and, in some case, incorrect synonyms (wrong usage of terminology). Variants can also result from typographical errors, spelling mistakes, and/or incorrect or inconsistent use of grammar (e.g., incorrect usage of capital letters, and/or punctuation).

In some examples, computer-implemented translation services reuse existing translations, or translations of similar text in an effort to increase the speed of translation, and provide some level of consistency. However, this still does not prevent developers from introducing different variants of source texts with equivalent content as illustrated in the example text strings recited above (i.e., User does not exist, User do not exist, User does not exists, . . . ).

In view of the above context, implementations of the present disclosure provide a computer-implemented text service that intervenes in the software development process to reduce variants, as described in further detail herein. In this manner, translation volume is reduced (e.g., the number of variants to be translated is reduced), and user experience with the software is improved (e.g., users are not left to wonder if similar, but different texts mean the same thing or something different). Further, the quality of text is improved (e.g., text which was already reviewed in the translation process is reused).

In some implementations, the computer-implemented text service is provided as a component of, or a plug-in to an integrated development environment (IDE). In some examples, the IDE is provided as one or more computer-executable programs that provides comprehensive facilities (e.g., source code editor, build automation tools, compiler, debugger) for developers to create software.

In accordance with implementations of the present disclosure, the computer-implemented text service can be provided at one or more stages of a software development process. Example stages of the software development process can include, without limitation, design-time (e.g., during which functionality and/or features of the application are planned, UI designers design UIs to be used in the application), and development-time (e.g., during which source code is written). In some implementations, the computer-implemented text service includes an interface, into which a developer can enter text. In some examples, the developer can also enter additional information (e.g., type of UI that the text is to be used with, the developer's native language).

In some examples, during design-time, a UI designer, for example, can enter text (and other information) into the interface, and a list of similar texts can be presented to the UI designer. The UI designer can select text from the list for use in the application. In some examples, the texts provided in the list have already been proofed, and includes text, for which translations in one or more other languages (other than the language the text was input into the interface in) exist. In some examples, during development-time, a coder, can enter a text (and other information) into the interface, and a list of similar texts can be presented to the coder, as similarly described above with reference to design-time. For example, it can occur that not all texts for the application are provided during design-time, and the subsequent developers (e.g., software coders) also create text that is to be used in the application.

Implementations of the present disclosure also include automatically translating texts based on translations of other text variants. In some implementations, the different types of text variants that are used can be limited. For example, the computer-implemented text service can be configured to limit the number of text variants used for translation.

In some implementations, the computer-implemented text service can check existing text repositories for equivalent source texts. This can be performed as part of a quality check for existing texts. In some examples, additional quality checks can be used to identify source text variants having a relatively lower quality level than others (e.g. spelling mistakes, missing articles, incorrectly used uppercase letters). In some examples, authors (e.g., developers) of the texts (or other responsible users) can be automatically notified, and asked to check whether another source text suggested by the computer-implemented service could (or should) be used instead. For example, authors are already familiar with receiving questions, and being asked to improve their texts during translation processes. In accordance with implementations of the present disclosure, this process can be automated, thereby achieving a reduction in workload during the translation process.

An example process for determining the similarity of text strings and providing suggested text strings is described in further detail herein. In some examples, the computer-implemented text service can execute the example process to provide the list of similar texts, from which a user (e.g., developer) can select text to be used in an application. At a high-level, the example process includes providing a source text repository, pre-processing text, comparing texts, and providing the list of similar text.

Figure 2:
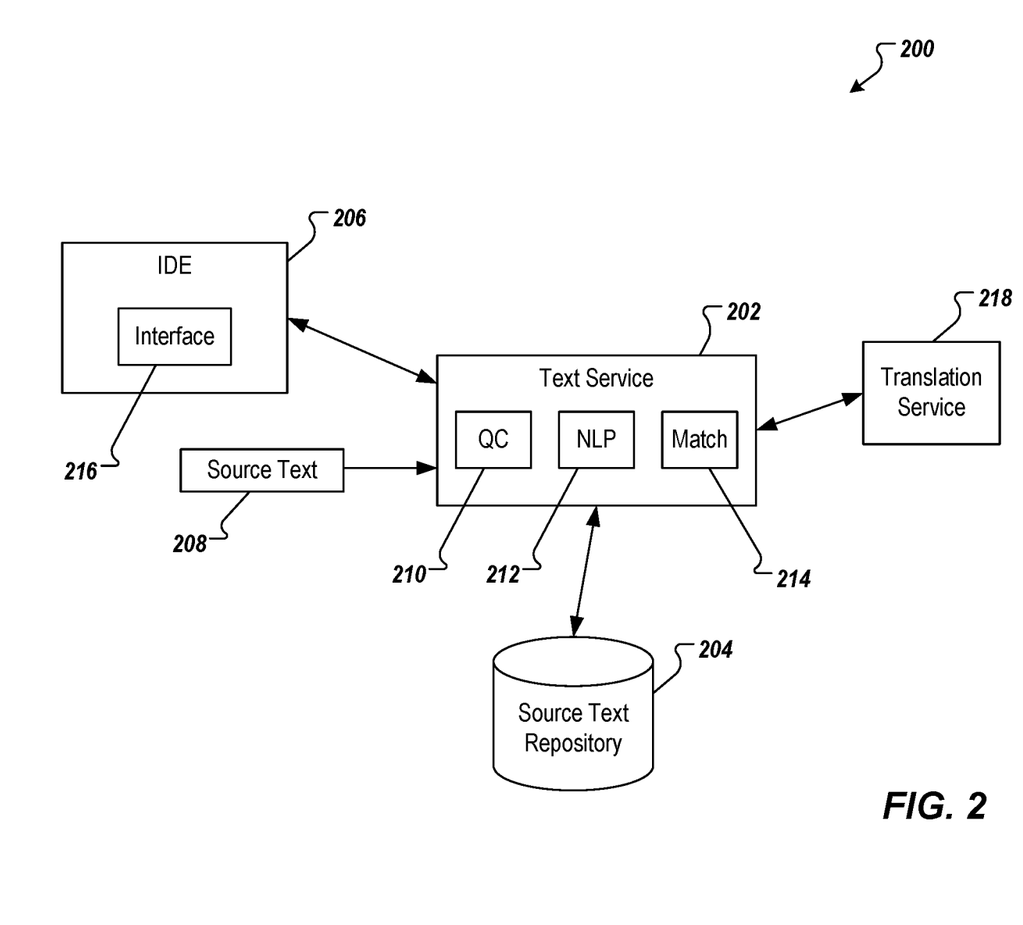
FIG. 2 depicts an example component architecture in accordance with implementations of the present disclosure.

FIG. 2 depicts an example component architecture 200 in accordance with implementations of the present disclosure. The example process will be described with reference to FIG. 2. In the depicted example, the example component architecture 200 includes a text service 202, a source text repository 204, an IDE 206, and source text 208. In the depicted example, the text service 202 includes a quality correction (QC) component 210, a natural language processing (NLP) component 212, and a matching component 214. Although the QC component 210, the NLP component 212, and the matching component 214 are depicted as components of text service 202, one or more of these components can be external to the text service 202 (e.g., third-party services that the text service 202 communicates with). In the depicted example, the IDE 206 includes an interface 216. In some examples, and as described above, the interface 216 can be displayed to the user and can be used to submit source text (e.g., the source text 208), and receive a list of similar text, from which the developer can select text to be used in an application the developer is developing.

The example component architecture 200 further includes a computer-implemented translation service 218. In some examples, text can be transmitted to the translation service 218 from the text service 202, and can include an indication as to one or more languages the text is to be translated into. In some examples, the translation service 218 processes the text to provide one or more translations back to the text service 202.

In some implementations, the text service 202 processes the source text 208 to provide one or more similar texts (e.g., in the list of similar texts) for selection by the developer. In some examples, the source text 208 is provided by the developer, as the developer uses the IDE 206 to develop an application. For example, the developer (e.g., non-English speaker) can determine that they would like to use the phrase "This user no exist." The developer can enter the phrase into the interface 216, and the phrase is provided as the source text 208 to the text service. In another example, a legacy text repository can be provided (not shown in FIG. 2), and entries of the legacy text repository can be imported into the text service 202 for processing. For example, an entry of the legacy text repository can include text previously used in one or more applications, and can be imported into the text service 202 as the source text 208.

In some implementations, the source text repository 204 includes one or more entries, each entry corresponding to a source text 202 that has already been received and processed by the text service 202, as described herein. In some examples, each entry includes: a source text identifier (ID) (e.g., a unique identifier assigned to the source text), original source text (e.g., the source text 202 as originally entered), original source text with quality corrections (e.g., the source text as originally entered and corrected using a computer-implemented correction service), a list of normalized words and/or phrases with part-of-speech (POS) tags or patterns from the original text, and metadata. Example metadata can include, without limitation, UI type (e.g., type of UI text is used in—button, menu entry, message, message type), quality status (e.g., verified, proofread), and native language of author. For example, and as described above, a developer can enter text into the interface 216, as well as additional information (e.g., UI type, native language), which information can be recorded as metadata. In some examples, an entry can include one or more translations of the original source text, and/or an identifier identifying a system of origin of the original text. For example, if the original source text had been translated into German and Russian, the entry can include both the German translation, and the Russian translation.

In some implementations, an errors document (or database) can be electronically stored. In some examples, the errors document can provide errors that commonly occur when a developer having a first language as their native language provides text in a second language that is different from the first language. As one non-limiting example, the errors document can provide a list of errors commonly seen when Russian-speaking developers enter text in English.

In accordance with implementations of the present disclosure, the source text 208 (also referred to as original source text (OST)) is received by the text service 202. In some implementations, the source text 208 is processed by the QC component 210 to provide one or more quality corrections, if appropriate. In some examples, the QC component 210 includes from one or more quality check routines. Example quality check routines can include, without limitation, spell checking, and grammar checking. For example, the source text can be processed to identify spelling errors and/or grammar errors, and to correct any such errors to provide OST with quality corrections (OST-QC). By way of non-limiting example, example OST can include "There is An arror," and the resulting OST-QC can be provided as "There is an error," the spell check correcting a misspelling, and the grammar check correcting an improper capitalization. In some examples, the quality corrections can include an abbreviation check to convert abbreviations to full words/phrases. By way of non-limiting example, an example OST can include "There is an ERR," and the resulting OST-QC can be provided as "There is an error," the abbreviation check converting the abbreviation to a full word.

In some implementations, the OST-QC is processed to provide a part-of-speech (POS)-tagged list of individual words and/or punctuation that are present in the OST-QC. More particularly, the QC component 210 provides the OST-QC to the NLP component 212, which processes the OST-QC, as described herein. In some examples, the NLP component 212 processes the OST-QC to provide the list of individual words and/or punctuations.

In some implementations, the NLP component 212 uses a tokenizer to split the text of the OST-QC into a list of individual words and/or punctuations. For example, the example text "Industry refers to the production of an economic good within an economy." can be processed using a tokenizer to provide the following example list of individual words and punctuation:

| Text |
|---|
| Industry |
| refers |
| to |
| the |
| production |
| of |
| an |
| economic |
| good |

-continued

| Text |
|---|
| within |
| an |
| economy |
| . |

In some examples, the list of individual words and punctuation is processed by a POS tagger to tag each word/punctuation with a POS tag. In some examples, a POS tag describes a POS that the particular word belongs to. Example POS tags can include nouns (proper, singular, plural), verbs (base form, past tense, gerund, past participle), adjective (comparative, superlative), pronoun (personal, possessive), adverb (comparative, superlative), number (cardinal), and the like. For example, the above-example list of individual words and punctuation for the example text "Industry refers to the production of an economic good within an economy." can be processed by a POS tagger to provide the following example tagged list of individual words and punctuation:

| Text | POS Tag |
|---|---|
| Industry | n1 |
| refers | vvz |
| to | p-acp |
| the | dt |
| production | n1 |
| of | pp-f |
| an | dt |
| economic | j |
| good | i |
| within | p-acp |
| an | dt |
| economy | n1 |
| . | . |

For example, industry, production, and economy are singular nouns, economic is an adjective, refers is the s-form of a lexical verb, the and an are articles (definite, indefinite), etc.

In some implementations, the tagged list of individual words and punctuation is processed using a POS pattern matcher to identify words that belong together. In some examples, the POS pattern matcher can include a set of POS patterns that can be (and/or are typically) included in sentences. In some examples, sets of POS tags (including two or more POS tags) are compared to POS patterns in the set of POS patterns to identify any matches. In some implementations, a so-called Lemmatizer can be used to provide the basic form of words or phrases, as normalized phrases. In some examples, the Lemmatizer uses lemmatization to group together different inflected forms of a word, so they can be analyzed as a single item. Continuing with the example above, the POS tags can be processed using the POs pattern matcher to determine that, for example, "vvz, p-acp" is a POS pattern that is found in the POS tags for the example text, and that the POS pattern corresponds to "refers to," which can be processed using the Lemmatizer to provide "refer to" as a normalized phrase from the example text.

In some implementations, computational linguistics programs can be combined with other computer-implemented tools, and/or databases, dictionaries, etc. For example, the POS tagger can be enhanced using enterprise- and/or industry-specific terminology databases to improve accuracy of tagging enterprise- and/or industry-specific terms and/or abbreviations. An example enterprise-specific terminology database includes SAPterm, provided by SAP SE of Walldorf, Germany. In some examples, SAP term provides terminology and/or POS tags for words/abbreviations that may be specific to SAP SE. In some examples, an enterprise-specific terminology database (e.g., SAPterm) provides, for each entry, the POS information and any accepted/expected abbreviations, which have been previously used by developers (e.g., in previously developed software). In some implementations, the POS tagger can be enhanced by automatically providing different abbreviations for given texts, and using a backward search to determine possible source texts for abbreviations, which might not be recognized by linguistic tools.

In some implementations, the OST-QC is compared to entries of the source text repository 204 to determine whether there are one or more entries that sufficiently match the OST-QC. In some examples, the OST-QC is compared to respective OST-QCs of entries in the source text repository 204. In some examples, as a result of comparing OST-QCs for comparison, instead of the original source texts, more precise matches, if any, can be determined than would be achievable if the original source texts were used.

In some implementations, for each OST-QC comparison, an edit distance can be determined. In some examples, an edit distance is used to quantify how similar/dissimilar two text strings are to one another, and is provided as a value that is determined based on a number and/or type of operations required to transform one text string into the other text string. In some implementations, edits distances are determined for the OST-QC and respective OST-QCs of the entries in the source text repository 204. In some examples, each edits distance is compared to a threshold edit distance, where, if the edit distance is less than the threshold edit distance, the OST-QC is determined to be the same as, or sufficiently similar to the OST-QC of the respective entry. If the edit distance is not less than the threshold edit distance, the OST-QC is determined to not be sufficiently similar to the OST-QC of the respective entry.

In some implementations, if one or more comparisons yield edit distances that are less than the threshold edit distance, the OST-QCs of the respective entries are returned to the user in a list of similar texts, described in further detail herein. In some examples, the OST-QCs are ranked in the list of similar texts based on respective edit distances (e.g., from lowest to highest).

In some implementations, if none of the comparisons yield edit distances that are less than the threshold edit distance, the OST-QCs of the respective entries are determined to not be sufficiently similar to the OST-QC provided from the entered OST. In some examples, if no OST-QC of the entries is determined to be sufficiently similar, the list of normalized words/phrases of the OST is compared to respective lists of normalized words/phrases of the entries in the source text repository 204. In some examples, an overlap value is determined based on the list of normalized words/phrases of the entered source text, and the list of normalized words/phrases of a respective entry in the source text repository 204.

In some examples, each overlap value is compared to a threshold overlap value, where, if the overlap value is less than the threshold overlap value, the entry is determined to be the same as, or sufficiently similar to the entered source text. If the overlap value is not less than the threshold overlap value, the entered source text is determined to not be sufficiently similar to the respective entry.

In some implementations, if one or more comparisons yield overlap values that are less than the threshold overlap values, the OST-QCs of the respective entries are returned to the user in a list of similar texts, described in further detail herein. In some examples, the OST-QCs are ranked in the list of similar texts based on respective overlap values (e.g., from highest to lowest). In some implementations, if none of the comparisons yield overlap values that are less than the threshold overlap value, the respective entries are determined to not be sufficiently similar to the entered source text. In some examples, if no entry is determined to be sufficiently similar, the entered source text is determined to have no corollary within the source text repository 204, and is added to the source text repository 204 as a new entry.

In some implementations, the user can indicate that the search for similar source texts be limited based on length. For example, the text may be intended to be used within a UI that has limited space. Consequently, the user may want to limit the length of the text to-be-inserted to a maximum length (e.g., maximum number of characters). In some examples, and in response to the user indicating the text length limit, similar texts can be filtered from inclusion in the list of similar texts. For example, if a source text within the source text repository is determined to be appropriate for inclusion in the list of similar texts (e.g., edit distance is lower than threshold, overlap score exceeds the threshold), but the length of the source text exceeds the text length limit, the source text is not included in the list of similar texts.

In some implementations, the user can indicate whether the similar source text(s) includable in the list of similar texts can include abbreviations. In some examples, if the user allows abbreviations, source texts that include abbreviations can be included in the list of similar texts. In some examples, if the user does not allow abbreviations, only source texts that are absent abbreviations can be included in the list of similar texts.

In some implementations, and as described above, a list of similar texts can be provided to a user. For example, in response to source text (e.g., OST) input by the user, a list of similar texts can be displayed. In some examples, the list of similar texts includes one or more similar text strings provided from the source text repository 204. In some examples, the similar text strings provided in the list of similar texts includes the OST-QC for the respective entry in the source text repository 204. If multiple source texts are provided in the list of similar texts, the similar texts can be displayed in rank order based on edit distance (e.g., lowest to highest) or overlap score (e.g., highest to lowest).

In some implementations, the rank order can be determined based on UI type. In some examples, UI type corresponds to the use of the similar text in one or more programs. For example, example UI types can include buttons, dialogue boxes, menu entries, and messages. For example, the user inputting the source text (e.g., OST) can indicate the UI type that the source text is intended for. In some examples, text that is provided in the list of similar texts can be ranked, such that texts associated with the same UI type can be ranked higher than other texts.

In some implementations, if an entry corresponding to a similar text provided in the list of similar texts includes one or more translations for the similar text, one or more translation indicators can be displayed with the similar text. For example, if a similar text is provided in English, but the entry in the source text repository 204 includes both German and Russian translations, one or more translation indicators can be displayed. For example, a single translation indicator can be displayed, which can be selected by the user, and in response, the German translation and the Russian translation are displayed. As another example, multiple translation indicators can be displayed, one for the German translation, and another for the Russian translation, each of which can be selected by the user to display the respective translation.

In some implementations, a source text in the list of source texts can be selected for use in software (application, program) that the user is developing. In some examples, in response to user selection of the source text, the source text is automatically inserted into an interface of the IDE 206 that the user is using to develop the software.

Figure 3:
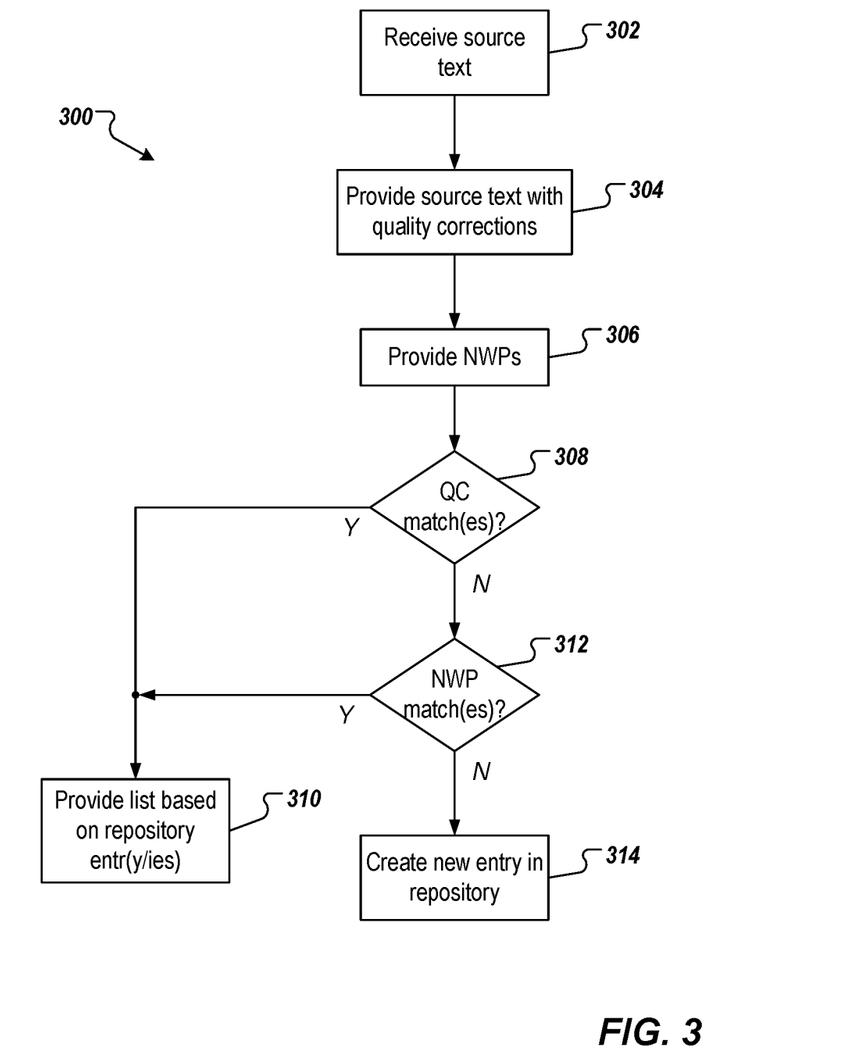
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices.

Source text is received (302). For example, a user can provide original source text (OST) through an interface (e.g., the interface 216 of FIG. 2). Source text with quality corrections is provided (304). For example, the OST can be processed to identify spelling errors and/or grammar errors, and to correct any such errors to provide OST with quality corrections (OST-QC). A list of normalized words/phrases (NWPs) is provided (306). For example, the OST-QC is processed as described herein to provide the NWPs.

It is determined whether there is a QC match (308). For example, and as described herein, the OST-QC is compared to entries of a source text repository (e.g., the source text repository 204 of FIG. 2) to determine whether there are one or more entries that sufficiently match the OST-QC. If there is a QC match, a list is provided based on the matching repository entr(y/ies) (310). For example, the OST-QCs of the respective entries are returned to the user in a list of similar texts, as described in further detail herein. If there is not a QC match, it is determined whether there is a NWP match (312). For example, if no OST-QC of the entries is determined to be sufficiently similar (e.g., in (308)), the list of normalized words/phrases of the OST is compared to respective lists of normalized words/phrases of the entries in the source text repository. If there is a NWP match, a list is provided based on the matching repository entr(y/ies) (310). If there is not an NWP match, a new entry is created in the source text repository (314).

Figure 4:
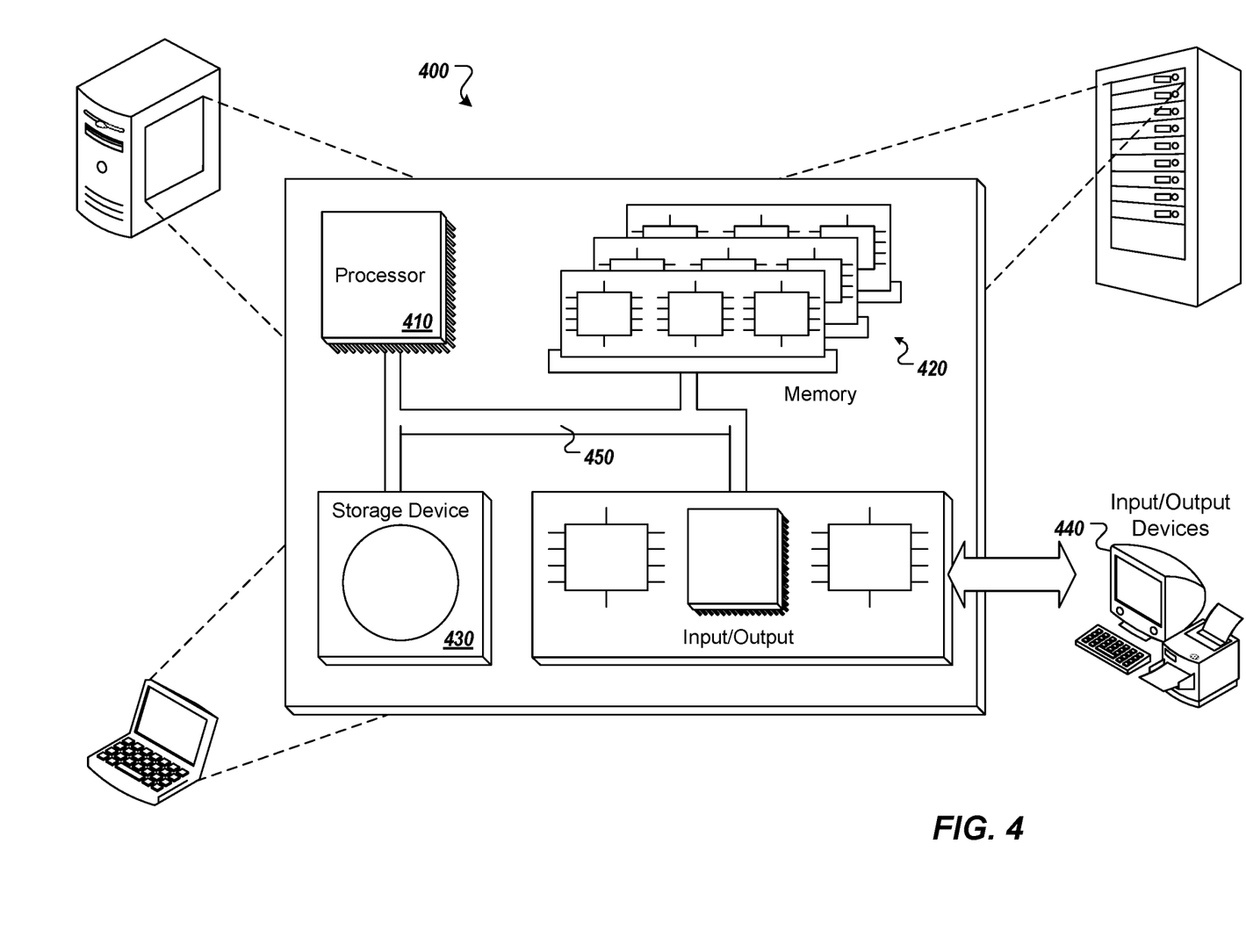
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device), for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a list of similar texts to a user developing a software program, the method being executed using one or more processors and comprising:
   receiving, by the one or more processors, an original source text (OST) from the user, the OST comprising a text string;
   providing, by the one or more processors, an OST with quality correction (OST-QC), the OST-QC comprising one or more corrections to the OST;
   determining, by the one or more processors, that a source text repository comprises a first entry that is sufficiently similar to the OST-QC, and in response, including a QST-OC of the first entry in the list of similar texts;
   determining, by the one or more processors, that the source text repository includes no first entry sufficiently similar to the OST-QC, and in response:
      lemmatizing, by the one or more processors, the OST-QC to provide a normalized OST-QC that includes a normalized word/phrase of the OST-QC, and
      determining, by the one or more processors, a second entry that has a normalized word/phrase sufficiently similar to the normalized OST-QC, and in response, including a OST-QC of the second entry to the list of similar texts;
   transmitting, by the one or more processors, the list of similar texts for display to the user; and
   automatically inserting a similar text of the list of similar texts into the software program in response to user selection of the similar text from the list of similar texts,
   wherein sufficient similarity between the OST-QC and an entry of the source text repository is determined based on an edit distance between the OST-QC and an OST-QC of the entry, the edit distance being a value provided based on operations needed to transform the OST-QC into the OST-QC of the entry.

2. The method of claim 1, wherein the OST-QC is determined to be sufficiently similar to a respective entry when the edit distance between the OST-QC and the OST-QC of the first entry is below a threshold edits distance.

3. The method of claim 1, further comprising:
providing an overlap score based on comparing the normalized OST-QC to the normalized word/phrase of the second entry,
wherein the normalized word/phrase of the second entry is determined to be sufficiently similar to the normalized word/phrase when the overlap score exceeds a threshold overlap score.

4. The method of claim 1, wherein the normalized OST-QC is at least partially provided based on one or more part-of-speech (POS) tags assigned to one or more words of the OST-QC, and comparing two or more of the POS tags to one or more POS tag patterns.

5. The method of claim 1, further comprising:
determining that an entry in the source text repository associated with the similar text includes at least one translation of the similar text; and
providing the at least one translation for display to the user.

6. The method of claim 5, wherein the at least one translation is provided from a computer-implemented translation service based on a OST-QC associated with the similar text.

7. The method of claim 1, wherein quality corrections comprise one or more of a spelling correction and a grammar correction.

8. A non-transitory computer-readable storage medium coupled to one or more processors and having instructions stored thereon which, when executed by the one or more processors, cause the one or more processors to perform operations for providing a list of similar texts to a user developing a software program, the operations comprising:
receiving an original source text (OST) from the user, the OST comprising a text string;
providing an OST with quality correction (OST-QC), the OST-QC comprising one or more corrections to the OST;
determining that a source text repository comprises a first entry that is sufficiently similar to the OST-QC, and in response, including a QST-OC of the first entry in the list of similar texts;
determining that the source text repository includes no first entry sufficiently similar to the OST-QC, and in response:
  lemmatizing the OST-QC to provide a normalized OST-QC that includes a normalized word/phrase of the OST-QC, and
  determining a second entry that has a normalized word/phrase sufficiently similar to the normalized OST-QC, and in response, including a OST-QC of the second entry to the list of similar texts;
transmitting, by the one or more processors, the list of similar texts for display to the user; and
automatically inserting a similar text of the list of similar texts into the software program in response to user selection of the similar text from the list of similar texts,
wherein sufficient similarity between the OST-QC and an entry of the source text repository is determined based on an edit distance between the OST-QC and an OST-QC of the entry, the edit distance being a value provided based on operations needed to transform the OST-QC into the OST-QC of the entry.

9. The computer-readable storage medium of claim 8, wherein the OST-QC is determined to be sufficiently similar to a respective entry when the edit distance between the OST-QC and the OST-QC of the first entry is below a threshold edits distance.

10. The computer-readable storage medium of claim 8, wherein the operations further comprise:
providing an overlap score based on comparing the normalized OST-QC to the normalized word/phrase of the second entry,
wherein the normalized word/phrase of the second entry is determined to be sufficiently similar to the normalized word/phrase when the overlap score exceeds a threshold overlap score.

11. The computer-readable storage medium of claim 8, wherein normalized OST-QC is at least partially provided based on one or more part-of-speech (POS) tags assigned to one or more words of the OST-QC, and comparing two or more of the POS tags to one or more POS tag patterns.

12. The computer-readable storage medium of claim 8, wherein operations further comprise:
determining that an entry in the source text repository associated with the similar text includes at least one translation of the similar text; and
providing the at least one translation for display to the user.

13. The computer-readable storage medium of claim 12, wherein the at least one translation is provided from a computer-implemented translation service based on a OST-QC associated with the similar text.

14. The computer-readable storage medium of claim 8, wherein quality corrections comprise one or more of a spelling correction and a grammar correction.

15. A system, comprising:
a computing device; and
a computer-readable storage device coupled to the computing device and having instructions stored thereon which, when executed by the computing device, cause the computing device to perform operations for providing a list of similar texts to a user developing a software program, the operations comprising:
  receiving an original source text (OST) from the user, the OST comprising a text string,
  providing an OST with quality correction (OST-QC), the OST-QC comprising one or more corrections to the OST,
  determining that a source text repository comprises a first entry that is sufficiently similar to the OST-QC, and in response, including a QST-OC of the first entry in the list of similar texts,
  determining that the source text repository includes no first entry sufficiently similar to the OST-QC, and in response:
    lemmatizing the OST-QC to provide a normalized OST-QC that includes a normalized word/phrase of the OST-QC,
    determining a second entry that has a normalized word/phrase sufficiently similar to the normalized OST-QC, and in response, including a OST-QC of the second entry to the list of similar texts,
  transmitting the list of similar texts for display to the user, and
  automatically inserting a similar text of the list of similar texts into the software program in response to user selection of the similar text from the list of similar texts,
  wherein sufficient similarity between the OST-QC and an entry of the source text repository is determined based on an edit distance between the OST-QC and an OST-QC of the entry, the edit distance being a value provided based on operations needed to transform the OST-QC into the OST-QC of the entry.

16. The system of claim 15, wherein the OST-QC is determined to be sufficiently similar to a respective entry when the edit distance between the OST-QC and the OST-QC of the first entry is below a threshold edits distance.

17. The system of claim 15, wherein the operations further comprise:
   providing an overlap score based on comparing the normalized OST-QC to the normalized word/phrase of the second entry,
   wherein the normalized word/phrase of the second entry is determined to be sufficiently similar to the normalized word/phrase in response to determining that the overlap score exceeds a threshold overlap score.

18. The system of claim 15, wherein the normalized OST-QC is at least partially provided based on one or more part-of-speech (POS) tags assigned to one or more words of the OST-QC, and comparing two or more of the POS tags to one or more POS tag patterns.

19. The system of claim 15, wherein operations further comprise:
   determining that an entry in the source text repository associated with the similar text includes at least one translation of the similar text; and
   providing the at least one translation for display to the user, wherein the at least one translation is provided from a computer-implemented translation service based on a OST-QC associated with the similar text.

* * * * *